July 10, 1928.  F. A. HOWARD  1,676,694
PYROGENESIS OF PETROLEUM PRODUCTS
Filed Feb. 2, 1926
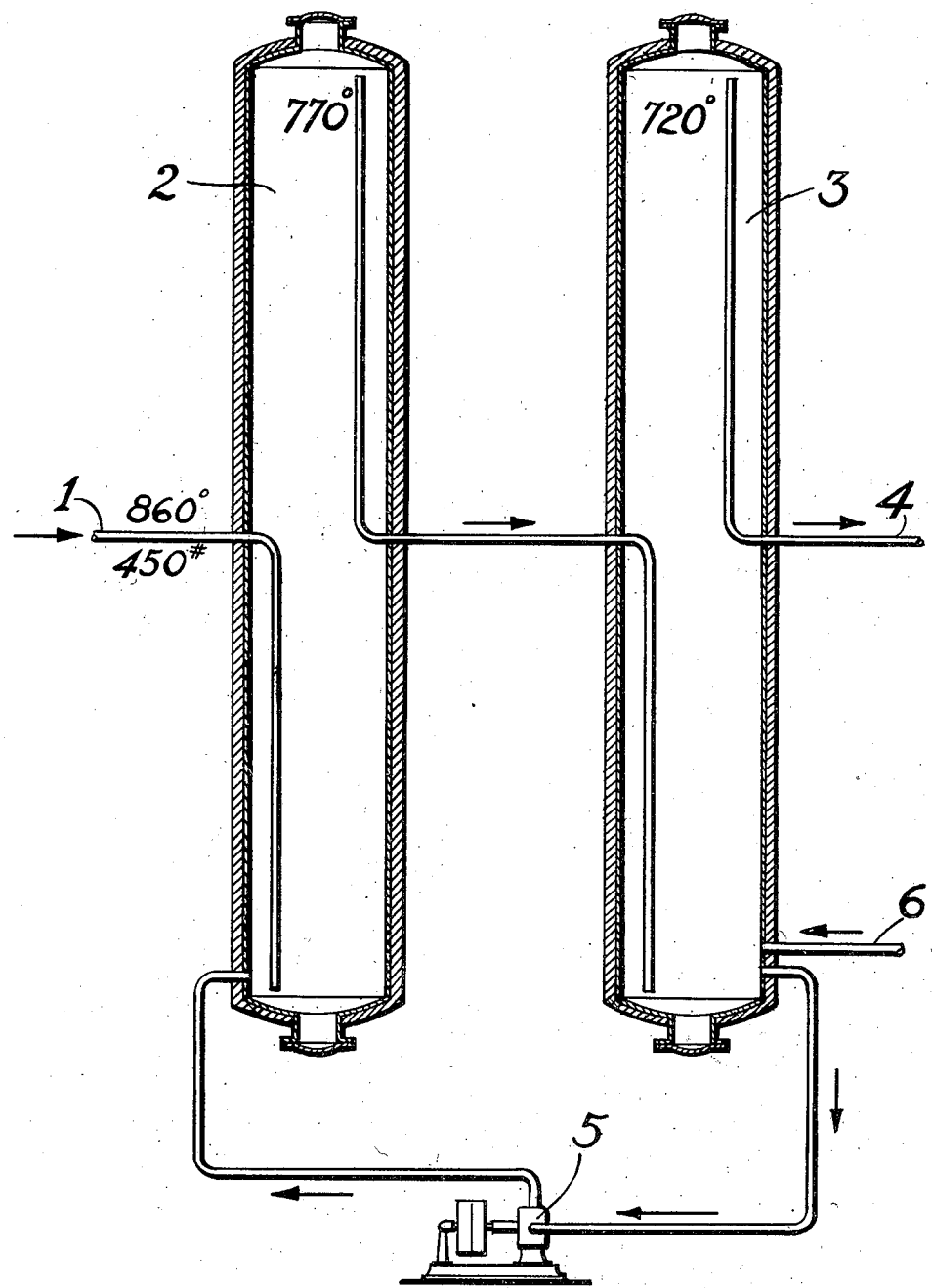
Frank A. Howard  Inventor
By  Attorney Patented July 10, 1928.

1,676,694

UNITED STATES PATENT OFFICE.

FRANK A. HOWARD, OF ELIZABETH, NEW JERSEY, ASSIGNOR TO STANDARD OIL DEVELOPMENT COMPANY, A CORPORATION OF DELAWARE.

PYROGENESIS OF PETROLEUM PRODUCTS.

Application filed February 2, 1926. Serial No. 85,432.

My present invention relates to pyrogenesis of petroleum products, and will be fully understood from the following specification, taken in connection with the appended drawing.

In the drawing, there is illustrated a system made up of a heated oil inlet pipe 1, a primary drum 2, a secondary drum 3, and an outlet pipe 4, the flow being in the order named, with the oil entering each drum near the lower end and leaving near the upper end, as shown on the drawing. Each drum is of a substantial construction and capable of carrying high internal pressure, and is insulated to prevent undue loss of heat through the walls. In addition to the straight-through connections above referred to, there is a reverse-circulation connection, comprising a power-driven circulating pump 5, having an inlet connection from the drum 3 and an outlet connection to the drum 2. There is also provided an auxiliary control line, designated 6, connected into the drum 3.

The operation of the equipment described above, when carrying out my present invention, is as follows:

A mixture of hydrocarbons, partly in the vapor phase and partly in the liquid phase, is delivered under a substantial pressure, for example 450 lbs., and at a temperature of 860° F., through the line 1 into the base of the drum 2. In this drum the temperature is maintained at approximately 770° F., for example, in a manner later described. When the drum has filled up with whatever liquid constitutents are delivered thereinto by the line 1 or by the products of condensation and/or polymerization or other reaction occurring in the drum 2 by reason of the high temperature existing therein, the mixture of vapors, gases, and liquid oily products will discharge from the overflow pipe at the top of the drum 2 into the base of the drum 3; and, in a similar manner, this drum having been filled with liquid, the products will emerge from the outlet line 4. The line 4 carrying off the mixed products of transformation may lead to an expander, separator, cooler, or other device for disposing of the mixed products of conversion in an advantageus manner. This is not concerned with the present invention.

By means of the introduction of a stream of relatively cool hydrocarbon oils, under pressure, through the pipe 6, the temperature in the drum 3 is held at a point well below the temperature in the drum 2, for example 720° F. This lower temperature will be in part the result of unavoidable loss of heat by radiation, in part the result of endothermic heat absorption by whatever cracking may take place within the drum 3, and in part (this being the easily regulable portion) by control of the temperature and amount of cool oil fed in through the pipe 6.

Through the reverse-circulation pump 5, the liquid contents of the drum 3 will be continuously discharged into the base of the drum 2, and by control of this circulation it is possible to hold the drum 2 at any desired temperature, for example, 770° F. where the entering stock is at a temperature of 860° F.

By the system described, it will be noted that I gain control of a pyrogenesis system by utilizing a secondary drum, through which the products of conversion from a primary drum are passed, controlling the temperature of the secondary drum to hold it at a point below that of the primary drum, and recirculating in a reverse direction the liquid products from the secondary drum to the primary drum to control the temperature of the latter.

It will be noted that a certain proportion of hydrocarbons which leave the primary drum 2 in the form of vapor will be condensed in the secondary drum 3, owing to the lower temperature existing therein. By this action, the proportion of vapor to liquid emerging from the system through the line 4 is reduced, as compared with the proportions which would exist in the absence of the secondary drum 3. Likewise, the Baumé gravity of the liquid product in the secondary drum 3 will be above the Baumé gravity of the liquid product in the primary drum 2. By continuous recirculation of the liquid from drum 3 back into the drum 2, there is attained a better relationship between temperature and Baumé gravity of the stock in the drum 2 than is obtainable without the use of the secondary drum 3 and recirculation connections herein described.

What I claim is:

1. The process of pyrogenesis of petroleum products which consists in delivering a stream of products of petroleum, heated to an active cracking temperature, into a primary drum in which the products remain at an elevated temperature, above a cracking temperature but below the temperature at which they are delivered, removing admixed products of conversion continuously from the primary drum and passing them through a secondary drum of similar form, maintaining in the secondary drum a temperature substantially below that in the primary drum, and recirculating a portion of liquid products from the secondary drum directly into the primary drum.

2. The process according to claim 1, in which the entire operation is conducted under a high pressure.

3. The process of pyrogenesis of petroleum products which consists in delivering a stream of products of petroleum, heated to an active cracking temperature, into a primary drum in which the products remain at an elevated temperature, above a cracking temperature but below the temperature at which they are delivered, removing admixed products of conversion continuously from the primary drum and passing them through a secondary drum of similar form, maintaining in the secondary drum a temperature substantially below that in the primary drum, regulating the temperature of the secondary drum by the application of a heat absorption medium thereto, controlling the temperature of the primary drum by regulated recirculation from the secondary drum, and maintaining a high pressure throughout the entire operation.

FRANK A. HOWARD.